March 21, 1933.  C. D. CHASE  1,902,278
FILM HOLDER
Filed July 9, 1930
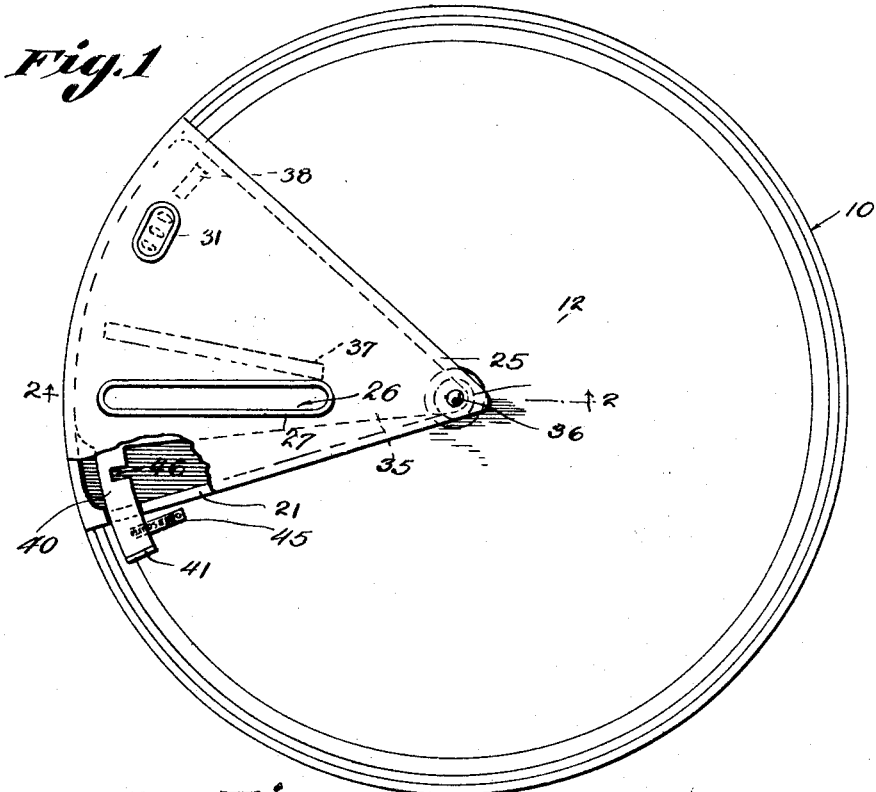
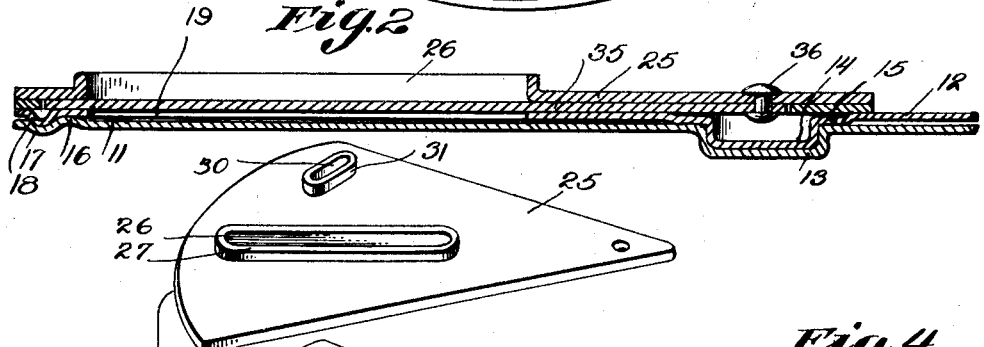
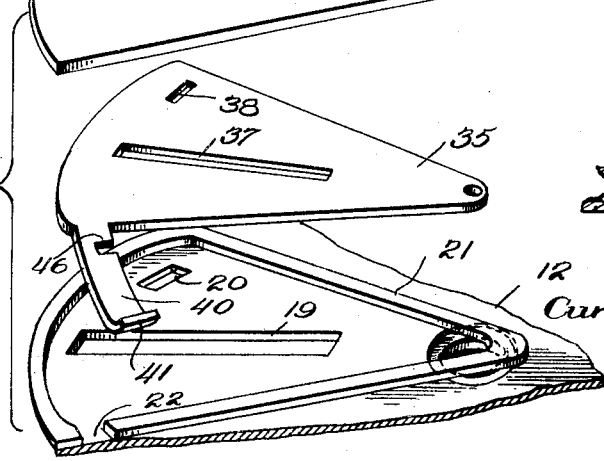 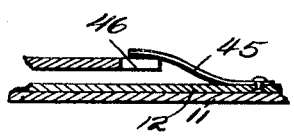
INVENTOR.
Curtis D. Chase
ATTORNEYS Patented Mar. 21, 1933

1,902,278

UNITED STATES PATENT OFFICE

CURTIS D. CHASE, OF BOSTON, MASSACHUSETTS, ASSIGNOR TO CHASE RIGHTS CORPORATION, OF PHILADELPHIA, PENNSYLVANIA, A CORPORATION OF PENNSYLVANIA

FILM HOLDER

Application filed July 9, 1930. Serial No. 466,818.

This invention relates to film holders for disc record photographic apparatus.

An object of the invention is to provide an improved disc film or record holder for use with disc cameras or projectors.

A further object is to provide a film holder which prevents the film from becoming light-struck prior to its insertion in the camera, while permitting the usual exposure opening to be uncovered when the holder and film incorporated therein are properly mounting of the holder within the camera.

A further object is the provision of a disc film holder having an exposure window and an operating slot, both of which are normally covered to protect the film therein, but which may be manually uncovered upon mounting of the holder within the camera.

A further object is to provide a disc film holder having openings and a curtain therefor, with means for indicating that the curtain has been actuated to a position permitting the film to be exposed within the camera, and/or that the film has been completely exposed and is ready for development.

Other objects will be in part obvious from the annexed drawing and in part indicated from the following analysis of the invention, in which reference is made to the accompanying drawing illustrating an embodiment of my idea.

In the drawing:

Fig. 1 is a face view of the disc holder in accordance with my invention;

Fig. 2 is a partial section along line 2—2 of Fig. 1;

Fig. 3 is a detail separated perspective view of the spacer, shield and cover elements incorporated with my improved film holder;

Fig. 4 is a detail of an exposure position indicating means in accordance with my invention.

Referring to the drawing, reference character 10 designates generally a film holder in which is mounted a disc film or record upon which, as generally understood, is photographed a plurality of pictures arranged sequentially and along a helix or spiral. The holder 10 comprises the circular sections 11 and 12, the section 11 being provided with a dished central depression 13 into which snugly fits a central hub 14 formed on the section 12. Adjacent the hub 14 there is formed a shouldered ring portion 15 bearing against the section 11, the section 12 being thereafter pressed outwardly to form a space or compartment which extends radially to adjacent the outer periphery of the section.

It will be understood that the disc film is provided with a central hole or aperture, thru which the hub 14 of the holder section 12 passes, the film thereafter extending in the space or compartment between the holder sections 11 and 12. The compartment is terminated along its outer periphery by a stamped depression 16 which engages with the section 12, the section 11 being also provided with an annular seat 17 into which snugly fits an annular depression 18 formed near the outer edge of the holder section 12 to render the film compartment light proof. The outer edges of the sections 11, 12 are spaced apart slightly to permit insertion of a tool thereby to separate the sections, thus permitting insertion or removal of a film within the holder in a dark room.

I provide in one section of the holder, preferably the upper section 12, a radial exposure window 19 of a width determining generally the width of the individual image or picture to be photographed, and of a length at least equal to the depth of the radial row of the images to appear on the film. A picker aperture 20, adjacent the periphery of the holder and spaced from the window 19, is also provided, and thru which a film driving element, such as a picker, may pass to engage driving slots in the film. A spacer or cage 21 is secured to the outer surface of the holder section, and defines a sector-shaped space about the window 19 and aperture 20.

A sector-shaped cover plate 25, by reference to Fig. 2, lies flush on the spacer 21 and is fixed therewith. There is thus formed between the under face of the cover plate 25 and the top face of the holder section 12, a space having a depth equal to the thickness of the spacer member 21.

The cover plate 25 is provided with an exposure window 26 in the form of an elongated radial slot which is defined by an upstanding flange 27. Likewise, the cover 25 is provided with an arcuate opening 30 similarly defined by an upstanding flange portion 31. The exposure window 26 of the cover plate directly overlies and is in registry with the exposure window 19 of the section 12; the same registering relation exists between the picker apertures 30 and 20, it being understood that the picker element by which the film is rotated within the film holder extends thru the apertures 30 and 20, and engages in picker slots cut along the peripheral edges of the film.

Within the spacer or cage 21 and disposed beneath the cover plate 25 and the face of section 12, I mount a shield 35 which is sector-shape in outline, but extending throughout a lesser arc than the spacer 21. The shield 35 is pivoted as by means of a pivot pin 36 to the cover plate 25, and thus pivotal or swinging movement thereof within the spacer 21 is permitted. The shield is provided with a window 37 in the form of a radial slot and with an aperture 38.

By reference to Fig. 1, the shield 35 is illustrated in an arcuate position with respect to its fulcrum point 36 so as to cover the exposure slot 19 of the holder section 12. Similarly, an imperforate portion of the shield is disposed beneath the picker aperture 20 of said section. Thus, the shield effectively prevents light from entering the film holder 10 thru the window slot 26 or aperture 30 when it is desired to prevent the film contained within the holder 10 from becoming light struck, such as prior to mounting of the film within the camera or prior to development thereof, after the photographs have been recorded thereon.

In order to provide a means for manually uncovering the exposure slot 19, I provide along one of the radial edges of the shield 35 an arm 40 which extends thru aperture 22 of the spacer member 21. The arm 40, which is disposed along an arc, is provided at its end with an upstanding lip or tongue 41, forming a grip by which the shield 35 may be swung within the spacer 21 to bring the radial slot 37 of the shield into registry with the exposure opening 26 and 20. The aperture 38 of the shield 35 is so disposed angularly to the slot 37 as to be likewise brought into registry with the picker apertures 20 and 30 of the holder and plate cover, respectively. It will thus be evident that the shield may be moved to cover or uncover the exposure and the picker openings of the film holder 10 whenever desired by merely grasping the grip 41 and actuating the shield 35 in the desired direction.

In order to provide an indication of the position of the shield 35 within the spacer 21, that is to say, whether the shield is so disposed as to cover or open the exposure openings, I provide means which indicate the angular position of the shield 35. This means may include a leaf spring 45 (Fig. 4) fixed at one end to the holder section 12 and adjacent the arm 40 of the shield 35, the other end of the spring pressing upwardly and normally engaging the under surface of the arm 40. On the outer face of the leaf 45 I may imprint a suitable legend such as the word "Exposed" which, if wholly visible, indicates either exposure position of the shield 35 or that the film has been exposed. On arm 40 an indentation 46 is provided, thru which, when the shield 35 is moved into position to register the respective exposure openings, the spring 45 passes. Consequently, the word "Exposed" is brought clearly and entirely into view and its appearance is a positive indication that the exposure windows 26, 37 and 19 of the plate cover 25, shield 35, and holder 12 are in registry.

When it is desired to curtain the exposure slots 19 and 26, the arm 40 may be manually urged inwardly whereby the shield 35 is moved to its window closing position within the spacer 21. The spring 45 remains up, thereby indicating that the film has been exposed and is ready to be developed, thus eliminating accidental double exposure.

It will thus be seen that the several objects of the invention are achieved in a simple and practical way and other advantageous results are obtained.

As many changes could be made in carrying out the above invention, without departing from the scope thereof, it is intended that all matter contained in the above description or shown in the accompanying drawing shall be interpreted as illustrative and not in a limiting sense.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. A film holder comprising complemental sections, one of which has a hub and the other has a depression into which the hub is seated, whereby the sections are centered with respect to each other, one of the sections having a seat near its periphery cooperating with a peripheral portion of the other section, whereby to provide a light-proof compartment between said sections, one of the sections being provided with an opening, a cover plate disposed over said section and having an opening in registering relation with the first-named opening, and means to interrupt and complete registry between said openings.

2. A film holder comprising complemental sections, one of which has a hub and the other has a depression into which the hub is seated, whereby the sections are centered with respect to each other, one of the sections having a seat near its periphery cooperating with a peripheral portion of the other section, whereby to provide a light-proof compartment between said sections, one of the sections being provided with an opening, a cover plate spaced from said section and having an opening disposed in registering relation with the first-named opening, and means arranged between the cover plate and said section operative to complete and interrupt registry between said openings.

3. A film holder comprising complemental sections, one of which has a hub and the other has a depression into which the hub is seated, whereby the sections are centered with respect to each other, one of the sections having a seat near its periphery cooperating with a peripheral portion of the other section, whereby to provide a light-proof compartment between said sections, one of the sections being provided with an opening, a cover plate spaced from said section and having an opening disposed in registering relation with the first-named opening, and manually actuable means arranged between the cover plate and said section operative to complete and interrupt registry between said openings.

4. A film holder comprising complemental sections, one of which has a hub and the other has a depression into which the hub is seated, whereby the sections are centered with respect to each other, one of the sections having a seat near its periphery cooperating with a peripheral portion of the other section, whereby to provide a light-proof compartment between said sections, one of said sections having an exposure slot and an aperture therein, a cover plate disposed on said section and having an exposure slot and an aperture therein, and a shield operative in one position to interrupt registry between said slots and apertures and in another position to complete registry between said slots and apertures.

5. A film holder comprising complemental sections, one of which has a hub and the other has a depression into which the hub is seated, whereby the sections are centered with respect to each other, one of the sections having a seat near its periphery cooperating with a peripheral portion of the other section, whereby to provide a light-proof compartment between said sections, one of said sections being provided with an exposure slot and an aperture therein, a cover plate disposed on said section and having an exposure slot and an aperture, a shield disposed between said cover plate and said section and having an exposure slot and an aperture therein, and means for bringing the respective slots and apertures into registry.

6. A film holder comprising complemental sections centered with respect to each other, one of said sections being provided with an exposure slot and picker opening, a segmental spacer element disposed about said slot and opening, a cover plate disposed on said spacer and provided with an exposure slot and a picker aperture, and means pivotally mounted within the spacer movable throughout the arc thereof and operative to complete and interrupt registry between the respective exposure slots and apertures.

7. A film holder comprising complemental sections centered with respect to each other, one of said sections being provided with an opening, a segmental spacer member disposed about said opening, a fixed cover plate disposed above said spacer and opening and provided with openings in registering relation with said first-named openings, and means movable in said spacer throughout the arc thereof and operative to complete registry between said openings.

8. A film holder comprising complemental sections centered with respect to each other, one of said sections being provided with an exposure slot and a picker aperture, a spacer member disposed about said slot and aperture, a cover plate fixed on said spacer and provided with an exposure slot and a picker aperture, a shield having an exposure slot and a picker aperture and pivotally mounted within the spacer element, and means for registering the respective exposure slots and the picker apertures, said means including an arm extending exteriorly of the spacer member and the sections.

9. A film holder comprising complemental sections, one of said sections being provided with an exposure slot and a picker aperture, a spacer disposed about said opening and provided with an opening, a cover plate fixed on said spacer and provided with an exposure slot and a picker aperture, and a shield provided with an exposure slot and a picker aperture movably mounted within the spacer, the shield being provided with means extending thru the opening of the spacer whereby the shield may be actuated to bring into and out of registry the respective exposure slots and apertures.

10. A film holder comprising sections forming a film compartment, one of said sections having an opening therein, a cover plate disposed above said opening and provided with an opening in registering relation with the first opening, means to register and interrupt registry between said openings, and means cooperating with said last-mentioned means to indicate the registering or non-registering relation thereof.

11. A film holder comprising sections forming a film compartment, one of said sections having an opening therein, a cover plate having an opening therein in registering relation with the first-named opening, means to register and to interrupt registry between said openings, and means operative to hold frictionally said last-named means in non-registering relation prior to uncovering and to indicate the condition of the film in the compartment subsequent to a registering relation of said openings.

12. A film holder comprising sections forming a film compartment, one of said sections being provided with an opening, a spacer disposed on said section about said opening, a cover plate fixed to the spacer, and provided with an opening in alignment with said first opening, a shield provided with an opening and mounted for pivotal actuation within the spacer, the spacer being provided with an aperture, an arm on said shield extending thru said opening, the arm being provided with an indentation, and spring means normally bearing on said arm to frictionally hold the shield in non-registering position and operative to extend thru said indentation to indicate registry of the respective openings.

13. A disc film holder comprising substantially circular sections, one of said sections having a central depression, the other section having a central hub seating in said depression, said sections being spaced from each other substantially from said hub and depression to adjacent their peripheries whereby to form a film compartment, and a bead formed on one of said sections adjacent its periphery against which the other section engages, one of said sections having an opening to said film compartment.

14. A disc film holder comprising substantially circular sections, one of said sections having a central depression, the other section having a central hub seating in said depression, said sections being spaced from each other substantially from said hub and depression to adjacent their peripheries whereby to form a film compartment, and a bead formed on one of said sections adjacent its periphery against which the other section engages, one of said sections having an opening to said film compartment, the outer peripheral edges of said sections being spaced for the insertion of a section separating tool.

15. A disc film holder comprising substantially circular sections, one of said sections having a central depression and a bead adjacent its periphery, the other section having a central hub seating in said depression and engaging said peripheral bead and being otherwise spaced from the first section, whereby to form a film compartment, one of said sections having an opening to said compartment.

Signed at Washington, District of Columbia, this 18th day of April, 1930.

CURTIS D. CHASE.